United States Patent [19]
Beaudoin et al.

[11] 3,793,133
[45] Feb. 19, 1974

[54] HIGH ENERGY ABSORBING CONTINUOUS FILAMENT WEB LAMINATE

[75] Inventors: Jean M. Beaudoin; Robert J. Brock, both of Appleton; Herman G. Minshell, Menasha, all of Wis.

[73] Assignee: Kimberly-Clark Corporation, Neenah, Wis.

[22] Filed: Feb. 22, 1972

[21] Appl. No.: 228,349

Related U.S. Application Data
[63] Continuation-in-part of Ser. No. 126,530, March 22, 1971, abandoned.

[52] U.S. Cl.................. 161/148, 156/291, 156/306, 156/309, 161/129, 161/150, 161/156
[51] Int. Cl............................................. B32b 7/14
[58] Field of Search... 161/128, 129, 148, 150, 152, 161/156, 170; 156/176, 179, 291, 306, 309, 324

[56] References Cited
UNITED STATES PATENTS
3,695,985  10/1972  Brock et al. ........................ 161/148
3,459,627  8/1969   Vosburgh............................ 161/148
3,368,934  2/1968   Vosburgh............................ 161/150
3,542,634  11/1970  Such et al. ......................... 161/148

Primary Examiner—George F. Lesmes
Assistant Examiner—James J. Bell
Attorney, Agent, or Firm—C. Frederick Leydig

[57] ABSTRACT

Improved laminates comprising a low strength, fluid permeable web and a web of continuous filaments of a thermoplastic polymer are disclosed. The continuous filment web contains easily releasable intermittent autogenous bonds. Ply attachment in the laminate is achieved with a polymeric material which encapsulates the filaments to form disruptable adhesive bonds and extends into the permeable web at intermittent discrete areas. The disclosed laminates are attractive in appearance, absorb and retain fluid, and, in particular, possess unexpected superiority with respect to energy absorption, strength, and tear resistance.

30 Claims, 4 Drawing Figures

PATENTED FEB 19 1974 3,793,133

INVENTORS.
JEAN M. BEAUDOIN
ROBERT J. BROCK
HERMAN G. MINSHELL
BY Wolfe, Hubbard, Leydig, Voit & Osann
ATTORNEYS.

HIGH ENERGY ABSORBING CONTINUOUS FILAMENT WEB LAMINATE

RELATED APPLICATIONS

This application is a continuation-in-part of Ser. No. 126,530, now abandoned, filed Mar. 22, 1971, entitled High Energy Absorbing Continuous Filament Web Laminate.

BACKGROUND OF THE INVENTION

This invention relates to nonwoven fabrics and, more particularly, to lightweight, nonwoven laminates which include a web of continuous thermoplastic filaments.

Nonwoven webs comprised of substantially continuous and randomly deposited, molecularly oriented filaments of a thermoplastic polymer are widely known. Among others, the following U.S. Pats. illustrate a variety of methods for preparing such webs: Kinney (U.S. Pat. Nos. 3,338,992 and 3,341,394); Levy (U.S. Pat. No. 3,276,944); Peterson (U.S. Pat. No. 3,502,538); Hartmann (U.S. Pat. Nos. 3,502,763 and 3,509,009); Dobo et al. (U.S. Pat. No. 3,542,615); and Harmon (Canadian Pat. No. 803,714).

While many different methods are illustrated for initially preparing such continuous filaments webs, the available methods generally have at least three common features. First, the methods of preparation involve continuously extruding a thermoplastic polymer (either from the melt or a solution) through a spinneret in order to form discrete filaments. Thereafter, the filaments are drawn (either mechanically or pneumatically) in order to molecularly orient the polymer filaments and achieve tenacity. Lastly, the filaments are deposited in a substantially random manner onto a carrier belt or the like to form a web with substantially isotropic physical characteristics.

These webs have been used in a wide variety of product applications. For example, they have been employed as curtain drape material, bookbinding material, insulation, and backings for carpet. However, while the webs are generally suitable for uses such as have been described, there has been only limited use of these materials in the field of disposable fabric products, such as clothing, bed sheets, pillow cases, and the like. While products in these areas have employed nonwoven webs, the nonwovens have generally been prepared from staple length fibers that are either resin bonded or bonded to cellulose wadding. Also, scrim-reinforced materials, i.e., - crossed sets of threads bonded at their points of intersection and employed as a reinforcing layer for one or more plies of cellulose wadding such as creped tissue, have been used as disposable nonwovens. The optimum suitability of these nonwovens for disposable fabric uses is generally restricted with respect to either their appearance, their strength characteristics, or their ability to absorb energy under strain without adverse rupture.

The use of continuous filament nonwoven webs for disposable fabrics has been eliminated because of the need for a desirable "hand" in combination with a pleasing appearance and adequate strength characteristics. In this respect, it has been found that continuous filament webs possessing a desirable hand such that they would be suitable for uses such as bed sheets, garments and the like, do not possess the necessary uniform and functional opaque appearance required in such applications. While opaqueness can be increased by using high basis weight webs, such webs frequently do not have a desirable hand, particularly if subsequent softening techniques such as embossing are not employed. In this respect, it should be noted that the webs of the aforementioned Kinney patents as well as others are principally high basis weight webs possessing an accompanying undesirable hand. Other methods for improving the opacity of low basis weight webs, such as by using lower denier filaments, have processing drawbacks since, for practical purposes, it is difficult to extrude such low denier filaments.

Moreover, even if a continuous filament web were to be prepared with an acceptable combination of hand, opacity, and strength, the web would still be lacking a very important characteristic. Because such webs are comprised predominantly of hydrophobic thermoplastic polymers having an inherently low capacity for absorbing and retaining fluids such as water, the webs themselves also have such low capacity and retentiveness. This behavior is particularly troublesome where it is desirable to treat the web with an agent such as a flame retardant, a necessity for any type of a disposable product where the user comes into direct contact with the material. Customarily, flame retardants are inexpensively applied with an aqueous carrier. Accordingly, the inability to easily absorb and retain water is a serious drawback necessitating complicated and expensive treating methods to achieve the desired flame retardance, which methods can adversely affect the physical properties of the fiber. Also, because of this same characteristic, fabrics prepared from the continuous thermoplastic polymer webs do not acquire a high moisture content from the atmosphere, and this detracts from a natural fabric feel as well as presenting potential static problems.

Copending Robinson application Ser. No. 15,033 now abandoned in favor of continuation-in-part application entitled "Laminates of Tissue and Random Laid Continuous Filament Web," filed on Feb. 27, 1970, illustrates useful structures of continuous filament webs having a good hand and appearance, and also possessing good fluid absorbency and retention. In addition, the structures exhibit substantially isotropic stress and strain characteristics. The structures therein disclosed comprise a laminate of a lightweight cellulosic web and a lightweight web comprised of a plurality of continuous filaments of a thermoplastic polymer. The laminate is prepared by bonding the continuous filament web to the cellulosic web by means of a spaced pattern of adhesive. Preferred structures illustrated in Robinson comprise outer plies of cellulosic webs and a single inner ply of the continuous filament web.

OBJECTS OF THE INVENTION AND DESCRIPTION OF DRAWINGS

It is a principal object of the present invention to provide a lightweight continuous filament web laminate which possesses a desirable hand, a pleasing appearance, good fluid absorbency and retention, and which is additionally characterized by desirable strength properties, particularly with respect to the laminate's capacity to absorb energy under strain without rupture and its tear and tensile strength.

A further object is to provide a laminate having the characteristics described in the principal object which can be prepared in an economical and efficient manner.

Other objects and advantages of the present invention will become apparent by reference to the following description and the accompanying drawings in which.

SUMMARY OF THE INVENTION

Figure 1:
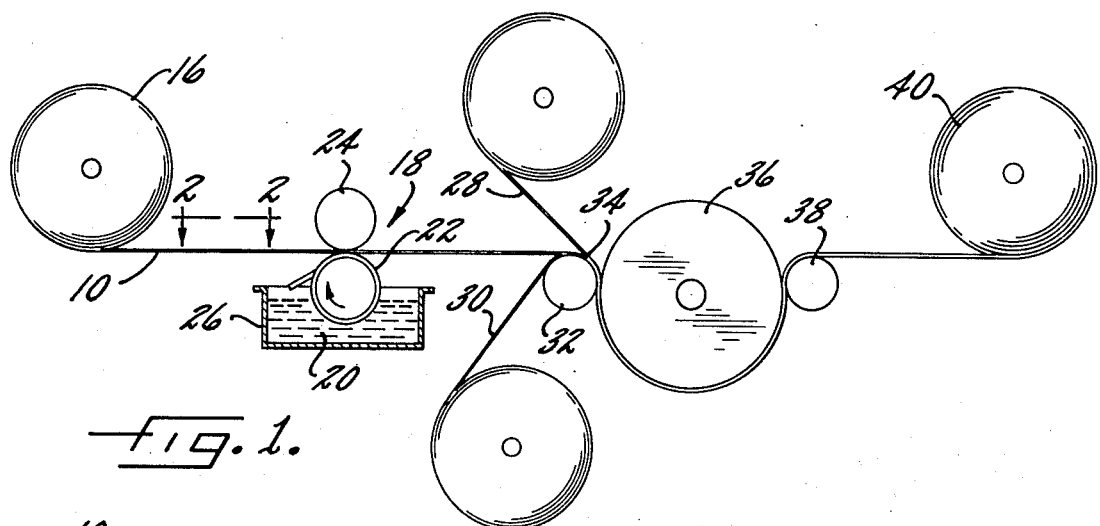
FIG. 1 is a schematic illustration of apparatus, and showing one means for forming the nonwoven laminates of the present invention.
Figure 2:
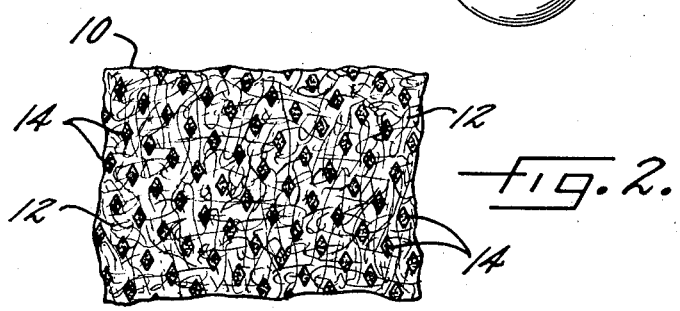
FIG. 2 is a plan view taken along line 2—2 of FIG. 1.

Briefly stated, laminates constructed in accordance with the present invention contain a continuous filament web of a thermoplastic polymer and a fluid permeable web of low strength such as a cellulosic web. The laminates are characterized by a distinctive combination of bonding features; one being that the continuous filament web is itself independently autogenously pre-bonded in an intermittent manner such that the filaments of the web can easily pull free from one another, and the other being that ply attachment in the laminate is achieved in an intermittent fashion with a disruptable polymeric material which encapuslates the continuous filaments but does not itself form such strong adhesive bonds as would cause a substantial number of the individual filaments to rupture before pulling free from the material.

Laminates containing this distinctive combination of bonding features can be simply prepared and possess a particularly outstanding capacity for absorbing energy when strained, tear strength, and tensile strength. Prebonding of the continuous filament web permits conventional handling of the web for lamination. Moreover, the fact that the filaments are intermittently bonded in a manner such that they can easily pull free from one another (i.e., are easily releasable) in the pre-bonded web and that the material used for ply attachment is disruptable and does not form strong bonds with the filaments is believed to directly contribute to the desirable energy absorbing characteristics of the laminates.

Energy absorption indicates the ability of a material to elongate under strain while at the same time effectively supporting the applied load during elongation. Thus, a material with a high capacity for absorbing energy can possess a high tensile strength which can be maintained over a significant elongation of the material. In other words, a material with good energy absorbing characteristics can "give" without rupturing when strained.

The capacity for absorbing energy is particularly desirable in fabric-like articles such as garments and sheets which are constantly subjected to localize strains such as at the toe area in bed sheets and the elbow and knee area in wearing apparel. The ability to "give" without rupturing while supporting an applied strain, i.e., the ability to absorb energy, permits the fabric to comfortably accommodate an applied strain without undesirable fabric deterioration.

DESCRIPTION OF THE PREFERRED EMBODIMENTS

While the present invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

a. Description of Preparation of Continuous Filament Web with Easily Releasable Bonds Laminates prepared in accordance with the present invention contain a nonwoven web of substantially continuous and randomly deposited, molecularly oriented filaments of a thermoplastic polymer. The manner in which the web is initially prepared, i.e., the web laydown technique, is not especially important in achieving the advantages of the present invention and any of a variety of known techniques such as described in the aforementioned patents can be employed. A particularly useful method of web laydown is also described in United States Dorschner et al. Pat. No. 3,692,618.

The technique described in U.S. Pat. Ser. No. 3,692,618 permits especially high rates of web formation. The disclosed method involves conventional spinning of continuous filaments of a synthetic polymer by, for example, extruding the polymer through a multiple number of downwardly directed spinning nozzles, preferably extending in a row or multiple number of rows. The filaments as they are spun, are gathered into a straight row of side-by-side, evenly spaced apart, untwisted bundles each containing at least 15 and preferably from 50 up to 1,000 filaments. These filament bundles are simultaneously drawn downwardly at a velocity of at least 3,000 meters per minute, and preferably from 3,500 to 8,000 meters per minute, in individually surrounding gas columns flowing at a supersonic velocity and directed to impinge on a substantially horizontal carrier. The gathering of the filaments into the untwisted bundles and their drawing and directing to impinge on the carrier is preferably effected by passing the bundles through air guns which surround the filaments with a column or jet of air which is directed downward at supersonic velocity. The air guns are arranged so as to extend in one or more rows extending across the carrier at right angles to its direction of movement, so that the bundles confined in the gas columns as the same strike the moving carrier extend in a line or row at right angles across the carrier. In order to enchance intermingling of the bundles, they can be made to oscillate, the plane of oscillation being transverse to the direction of carrier movement. The carrier can be a conventional carrier used in a nonwoven art, such as an endless carrier or belt screen or the upper portion of a drum, as for example a screen drum.

When prepared as described above, the filament bundles, containing a number of parallel filaments, are laid down on the carrier in a loop-like arrangement with primary loops extending back and forth across the width of a section defined by the impingement of the air column from one air gun on the carrer. Before and as the parallel filament bundles impinge the carrier, they are broken up into sub-bundles containing a lesser number of parallel filaments and forming secondary smaller loops and swirls. The secondary loops and swirls overlap each other, and those of adjacent sections, to result in substantially complete intermingling with the overlapping portions of adjacent sections. Thus, the laid-down filament bundles form a continuous uniform nonwoven web.

While, as indicated above, the manner in which the web is initially formed is not particularly important with respect to the present invention, the nature of the thermoplasitc polymer employed to form the web and the manner in which the web is bonded after formation are important in order to realize the advantages of the present invention. Concerning the nature of the thermoplastic polymer, it is important that it be of a type which does not strongly adhesively bond with the material subsequently used to achieve ply attachment. It is believed that when such strong adhesive bonding is avoided, the filaments can pull free from the laminating material when the laminate is strained. This feature, in combination with disruption of the polymeric laminating material, is considered to be important in avoiding filament fracture, thus permitting the filaments to be continuously available as load bearing members during the straining process. Suitable thermoplastic polymers for use herein include the naturally non-adhering polymers such as hydrocarbons, e.g., polypropylene, polyethylene, polybutene, polyisobutlene, polybutadine, as well as mixtures of such thermoplastic polymers and copolymers thereof. Also, other polymers such as polyamides, polyesters, etc. can be used so long as the chosen polymeric laminating material does not strongly adhere thereto. Of the polymers, polypropylene is particularly preferred since continuous filament webs thereof can be simply and inexpensively prepared.

Turning now to the bonding of the continuous filament web, it has been previously indicated that such bonding is particularly desirable since it permits the web to be conveniently handled during the laminating procedure. In this respect, it should be noted that the web, as initially formed, is very flimsy and tenuous and in the absence of pre-bonding it is very difficult to adhesively print the web or otherwise handle it during lamination. However, apart from this aspect, it is also believed that web pre-bonding as hereinafter discussed contributes to the desirable energy absorbing characteristics and other strength properties of the resulting laminate.

In accordance with the present invention, bonding of the continuous filament web is accomplished in a manner such that the filaments can easily pull free from their particular bond areas when the web is placed under only a small amount of strain. On straining of the laminate it is believed that these bonds serve as initial load bearing sites. As the laminate is strained further, these bonds disappear due to filament release therefrom and the load bearing function in the laminate is transferred to the disruptable polymeric material with the filaments substantially intact.

An important aspect which should be appreciated in connection with the preparation of webs containing such easily releasable bonds is that, apart from their application in the presently described laminates, the webs alone generally have only very limited usefulness since their strength and energy absorbing characteristics are substantially less than optimum. This is paticularly so with respect to webs wherein the ply attaching polymeric material is an easily disruptable plastisol. This feature, however, emphasizes the unobvious character of the present invention since laminates prepared with such "underbonded" webs and a plastisol adhesive do exhibit very desirable strength, energy absorption, and tear resistance.

Due to the difficulty in bonding certain thermoplastic polymer filaments with an independently applied adhesive, autogenous heat bonding is employed to form the easily releasable bonds. Furthermore, it is preferred that web pre-bonding be accomplished only in an intermittent fashion rather than at all of the filament crossover points. Webs containing such an intermittent pattern of easily releasable bonds are flexible and drapeable and thus contribute to the overall fabric-like character of the prepared laminates. A further feature associated with the use of intermittently bonded webs is that the material employed for achieving ply attachment can be easily forced through the continuous filament web so as to encapsulate the filaments and into the adjacent cellulosic webs without excessively high pressures which might adversely affect the appearance or drapeability of the laminated product.

One arrangement of apparatus which can be employed for preparing webs contianing easily releasable autogenous bonds is depicted in Hensen and Pennings, U.S. application Ser. No. 177,077 filed on Sept. 1, 1971, entitled Pattern Bonded Continuous Filament Web. As shown therein, webs containing a plurality of intermittent autogenous bonds can be prepared by passing a continuous fialment web between the nip formed by two heated rolls, one of which contains a plurality of raised points on its surface. The pattern of the raised points is generally regular and is such that the total bonded area of the web is about 5–50 percent preferably 10–25 percent. The individual bonds are present in a density of about 50–3,200/in.$^2$ and preferably 100–500/in.$^2$.

While the general technique of web bonding using two heated rolls disclosed in Hansen and Pennings can be conveniently employed in forming webs useable herein, it should be appreciated that the principal object of the Hansen and Pennings application is to prepare webs which themselves contain optimum energy absorbing characteristics. This is achieved by controlling the bonding intensity such that the filaments release from the bond areas just before fracture. As a result, the preparation of laminates having the characteristics described herein is difficult with many of the webs disclosed in Hansen and Pennings since it requires the selection of a ply attaching polymeric material wherein cohesive failure occurs in that narrow range of stress load between failure of the bonds and failure of the filaments themselves. On the other hand, those webs which, for the purposes disclosed in Hansen and Pennings would be "underbonded", are quite useful herein for laminate formation. Laminates prepared with such underbonded webs have been found to have remarkably good energy absorbing and other strength characteristics and can be simply prepared as hereinafter illustrated with a variety of ply attaching polymeric materials.

When viewed under a microscope, the filaments in easily releasable bond areas for the most part have not lost their separate identities as filaments and appear as if to be only cohesively secured together.

Based on the techniques for establishing bonding intensity described in the Hansen and Pennings application, webs containing easily releasable bonds which are useful in accomplishing the present invention in the manner hereinafter specifically illustrated are characterized by an unfused bond area coefficient (ubac) of greater than about 55 percent, and preferably greater than about 65 percent. Alternatively, they are characterized by a strip tensile strength "Toughness Index" of less than about 130, and preferably less than about 75, in both the machine and cross-directions of the web.

As disclosed in Hansen and Pennings, the "ubac" for a given web is determined by randomly cutting 10 one inch square samples from a web and thereafter allocating each of the bonds in each of the ten samples to one of the following three categories: (1) 0–33 percent fusion; (2) 33–66 percent fusion; (3) 66–100 percent fusion. The per cent fusion in a given bond is determined by observing the bond at 100X magnification under a stereomicroscope with a grid having ten equal area portions placed over the bond. The fused area of a particular bond is that area wherein the presence of individual filaments cannot be identified throughout the area. The unfused bond area coefficient is that percentage of the total number of bonds which are categorized as 0–33 percent fused.

As also disclosed in Hansen and Pennings, the strip tensile "Toughness Index" is the product of the web's elongation (percent) at maximum tensile strength and the maximum tensile strength (lbs./inch) which is normalized for basis weight by dividing this product by the web basis weight (oz./yd.$^2$). The above-indicated values of toughness index are thought to be particularly applicable to continuous filament polypropylene webs having filament tenacities of above about 4 grams/denier and wherein there is substantially no visible filament degradation around the bond edges where the filaments enter the bond areas. The presence of filament degradation at the bond edges indicates "overbondedness" for the purposes of the present invention even though a suitably low strip tensile "Toughness Index" may be present. Elongation and tensile measurements can be obtained using a conventional Instron tensile testing machine on 8 by 8 inch samples folded so as to have four plies each being 2 inches wide and 8 inches long and using a 5 inches jaw span and a cross-head speed of 20 inches/minute. For the purpose of calculating the strip tensile "Toughness Index," the measured tensile strength is divided by 8 to obtain a value in lbs./inch.

Regarding the basis weight of continuous filament webs useful herein, basis weights on the order of about 0.3–1.5 oz./yd.$^2$ are ordinarily employed. There is little present incentive for preparing laminates with higher basis weight webs and, as the basis weight increases, it becomes increasingly difficult to achieve penetration of the ply attaching material through the web. Ordinarily, webs having a basis weight of about 0.3–0.8 oz./yd.$^2$ with filaments having deniers of about 0.5–10, and preferably 0.8–3, are most useful.

After formation of the pre-bonded web, it is frequently desirable to heat set the web prior to lamination. Since, as hereinafter illustrated, the web is subjected to high temperatures during lamination which can cause shrinkage of the continuous filament web, it is desirable to set the web prior to lamination. Such heat setting prevents subsequent shrinkage of the laminate with an accompanying puckering which for some purposes can be undesirable. Furthermore, heat setting also permits the laminate to be exposed to high temperatures after formation such as might be encountered in sterilization techniques, or finishing treatments such as the application of fire retardants and water repellents.

Heat setting can be conveniently accomplished by simply heating the pre-bonded web to a temperature higher than that which the web is likely to experience during lamination or other processing, but which is lower than that at which web degradation occurs. Customarily, the indicated heat setting is accomplished while th web is restrained in at least one direction. For continuous filament polypropylene webs, heat setting can be conveniently accomplished by exposing the web to a temperature of about 270–285°F. for about 2–5 seconds while placing mild restraint on the web in the machine direction. In the process of so doing, the filaments in the continuous filament web are believed to achieve thermal equilibrium at the heat setting temperature and, so long as the web is not thereafter exposed to a higher temperature, the web is thermally stable.

b. DESCRIPTION OF LAMINATE FORMATION

Turning now to the drawing, FIG. 1 schematically illustrates one manner in which laminates of the present invention can be prepared. As shown, a web 10 of substantially continuous filaments 12 of a thermosplastic polymer containing a plurality of easily releasable autogenous bonds 14 is unwound from a roll 16 and passed to an adhesive printing station 18. At the printing station, a discontinuous pattern of polymeric material 20 is printed onto the bottom surface of the web. Such is accomplished by passing the web between the printing roll 22 and back-up roll 24, the printing roll 22 being partially submerged in the tank 26 containing the polymeric material 20. The surface of the printing roll 22 is provided with an intaglio cell pattern which serves to pick up the material 20 from the tank 26 and transfer the material to the bottom surface of the web 10. A doctor blade can be used to control the quantity of material applied to the roll.

The cells on the roll 22 can be in any patterned configuration; however, so as not to adversely affect laminate drapeability, it is important that the pattern be substantially open and discontinuous and that, after printing, the area of the web which is occupied by the polymeric material 20 be not more than about 25 percent of the total area, and preferably only about 15 percent or less of the area. About 0.15–0.75 oz./yd.$^2$ of material, and preferably 0.3–0.6 oz./yd.$^2$ of material, is aemployed.

Following application of the polymeric material 20, cellulosic webs 28 and 30 are brought into contact with the printed web 10 at the roll 32 to form the laminate 34. As will be later discussed in detail, ply attachment is then effected by passing the laminate in contact with the heated drum 36 while under compressive pressure. By so doing, the polymeric material encapsulates the thermoplastic filaments and is forced into the cellulosic webs at intermittent discrete areas.

The selection of the polymeric material 20 constitutes an important aspect of the present invention. As indicated previously, the material should not form strong adhesive bonds with the polymer filaments. In addition, the material should, in its solidified condition, be disruptable so that when, under laminate strain, the load bearing function is transferred to the discrete areas of polymeric material (i.e., after filament release from the autogenous bonds), the material can itself pull apart, thus freeing the encapsulated filaments held in the discrete areas of material with an accompanying substantial amount of filament fracture. On disruption of the polymeric material, the load bearing function is transferred to the continuous filaments themselves, most of which are still intact and, accordingly, can serve as efficient load bearing members.

As should be apparent in view of the above discussion, the cohesive strength of the chosen polymeric material must be greater than the strength of the easily releasable autogenous bonds in order to obtain the indicated "programed" filament release. For a similar reason, the polymer cohesive strength should be less than the tenacity of the filaments in the continuous filament web in order to obtain filament release without fracture. On the other hand, so as to maximize energy absorption during strain, the disruption of the material should involve considerable "work" and, to this end, it is preferred that the cohesive strength of the material approach and be only slightly less than the tenacity of the polymer filaments.

While it should be apparent that a variety of "soft" polymeric materials can be employed including those applied as hot melts, latexes, plastisols, etc., a plasticized polyvinyl chloride polymer is preferably used. Such polymers can be conveniently applied to the web 10 as a plastisol, i.e., a sol of polymer particles in a liquid plasticizer such as dioctyl phthalate or the like, and thereafter cured to achieve a desirable level of cohesiveness while remaining flexible. Useful application viscosities for plastisols are on the order of about 800–6000 cps. and generally about 1,000–3,000 cps.

Vinyl chloride plastisols which contain vinyl chloride polymers and copolymers and organic phthalate, sebacate, adipate, or phosphate plasticizers are particuarly suitable. As described in TAPPI 50 (1), 79A–84A, at low temperatures, plastisols are fluids comprising vinyl resin particles uniformly distributed in a continuous phase of plasticizer. As the plastisol is heated, the plasticizer is absorbed into the resin particles, thus swelling them. Eventually, all the plasticizer is absorbed. The temperature at which such occurs is termed the gel point. On further heating, the swelled resin particles begin to lose their particulate identity and eventually a continuous plastic phase evolves. Such occurs at a temperature termed the fusion point and, in such condition, the plastisol is said to be fused.

When employed in preparing the laminates illustrated herein with continuous filament polypropylene webs containing easily releasable autogenous bonds, plastisol polymeric materials cured to at least their gel point but short of their fusion point are most useful. By being gelled, the plastisol has greater cohesive strength than the autogenous filament bonds thus satisfying the first important requirement in laminate preparation. And, so long as the plastisol is not fused, the second requirement of being disruptable prior to filament fracture is also achieved. Preferably, in order to obtain good delamination resistance in combination with optimum laminate energy absorption and other strength characteristics, the plastisol should be close to, but slightly short of, its fused condition. However, the temperature to which the plastisol is raised to effect curing should not be above the degradation point of the continuous filaments which, for polypropylene filaments, is on the order of about 280°F. Accordingly, depending on the plastisol selected, the degree of cure obtainable can be limited by the continuous filament web employed.

Cellulosic webs useful herein are customarily of low strength and can be chosen from any of a variety of materials such as cellulose wadding (e.g., creped tissue) and cotton or rayon webs. The principal requirements are that the web provide the desired opacity for the product laminate and that it have sufficient absorbency to retain any aqueous-borne additives such as flame retardants, printing inks, etc. that might be necessary for a particular application. In addition, in order to achieve ply attachment, the cellulosic web must be fluid permeable so that the polymeric material when applied as a liquid can be forced into the web. With respect to cellulosic webs, those having a basis weight of about 0.3–1 oz./yd.$^2$ are generally useful. Of course, it should be appreciated that the present invention includes continuous filament web laminates with low strength, fluid permeable materials other than cellulosic webs. Such other materials can include, for example, lightweight foams and films.

Turning now to the details of lamination as shown in the illustrated embodiment of the present invention, it should be noted that several features are important in obtaining a desirable laminate. In particular, so as to obtain good delamination resistance, the pressure applied to the laminate must be such that the polymeric material applied to the web 10 at the printing station 18 sufficiently penetrates the cellulosic webs 28 and 30 and encapsulates the filaments. However, polymeric material strike-through to the outer surfaces of the cellulose webs and adhesive spreading within the laminates should be minimized. Strike-through adversely affects laminate appearance, while adhesive spreading gives rise to an undesirable increase in laminate stiffness.

With particular reference to FIG. 1, suitable laminate formation with a plastisol polymeric material can be accomplished by appropriately coordinating the temperature of the heated drum 36, the time during which the laminate is in contact with the drum (dwell time), and the pressure exerted on the laminate in the nip formed between the drum and the roll 32. In understanding the manner in which these parameters are coordinated, reference is directed to FIG. 3. Embodiment (a) shows the plastisol 20 on the bottom surface of the web 10 prior to the time at which the web 10 is united with the cellulosic webs at the roll 32. The viscosity of the adhesive at this time is about the same as its application viscosity and thus is low. Consequently, on bringing the web into contact with the cellulosic webs and subsequently bringing the laminate into contact with the drum care must be exercised to avoid excessive adhesive penetration and spreading. Nip pressures between the roll 32 and the drum 36 on the order of about 70–100 pli are sufficient to achieve a desirable penetration and filament encapsulation as illustrated in embodiment (b) of FIG. 3.

Figure 3:
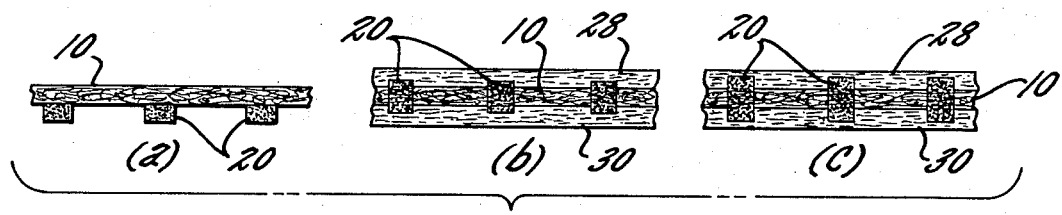
FIG. 3 is a schematic, cross-sectional view of a laminate in various stages of preparation and showing levels of adhesive penetration therein.

As the laminate travels on the drum surface, plastisol temperature and viscosity rise, and the problem of excessive adhesive penetration becomes less significant. Regarding travel on the drum surface, the laminate must remain in contact with the surface for a sufficient time to permit the plastisol to gel and develop desirable strength characteristics. For drum temperatures of about 250°–300°F. dwell times of 0.5–5 seconds are usually sufficient. Embodiment (c) of FIG. 3 depicts a cross-section of the finished laminate. As can be seen, little additional adhesive penetration occurs during curing on the drum surface.

Figure 4:
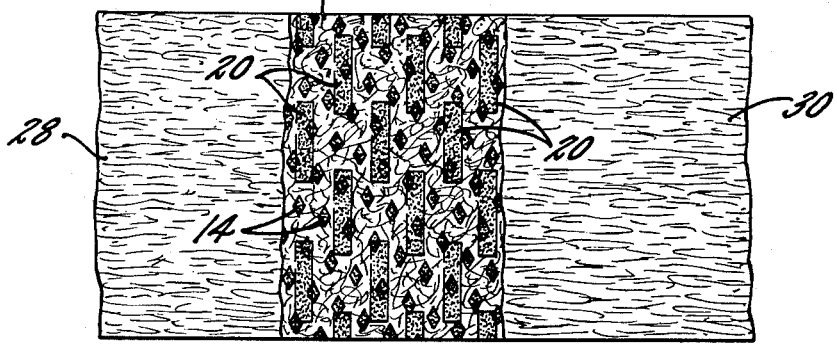
FIG. 4 is a fragmentary plan view of the laminate prepared as illustrated by FIG. 1, and with sections of individual layers broken away.

FIG. 4 illustrates a laminate prepared by the method described above. As shown, the laminate has outer plies of the cellulosic webs 28 and 30 and a single inner ply of the continuous filament web 10. The individual filaments in the web 10 are autogenously bonded together by means of the intermittent pattern of easily releasable bonds 14. Ply attachment is achieved by means of the spaced pattern of gelled but not fused plastisol 20 which encapsulates the filaments and extends into the cellulosic webs at the illustrated intermittent discrete areas.

The laminate illustrated in FIG. 4 is characterized by good aesthetic properties with respect to appearance and feel, readily absorbs and retains fluids, and additionally possesses highly desirable isotropic stress and strain characteristics. In addition the laminate possesses a high tensile and tear strength and a high capacity for absorbing energy.

In keeping with the present invention, laminates can be prepared having outer layers of continuous filament webs containing easily releasable bonds and a single inner layer of a cellulosic web. Such laminates can be easily prepared by the method illustrated with respect to FIG. 1 by employing two continuous filament webs 28 and 30, and a single cellulosic web 10. To achieve adequate ply attachment, the polymeric material can be printed on both sides of the cellulosic web. As is disclosed in Brock and Hudson application, Ser. No. 14,930 now abandoned in favor of a continuation-in-part application entitled "Laminates Containing Outer Plies of Continuous Filament Webs," filed on Feb. 27, 1970, laminates wherein the outer layers are continuous filament webs possess many desirable characteristics, such as an enhanced textile-like quality, wrinkle resistance, and the ability to be washed several times, in addition to the properties discussed above with respect to the aforementioned Robinson application. When such laminates are prepared with continuous filament webs such as described herein, wherein the continuous filament webs contain easily releasable bonds and the plastisol is gelled but not fused, the laminates also possess a high level of energy absorption which, as previously discussed, is very desirable.

While the present invention is principally based on the unique combination of bonding features previously discussed, viz., the easily releasable autogenous bonds and the use of a disruptable polymeric material, it is also believed that desirable energy absorbing, tear, and strength characteristics can be even further enhanced by selection of particular polymeric material print patterns. In particular, it has been found that it is desirable to employ a brick shaped print pattern which simulates a plain weave with a warp and fill weave directions at about 45° to the normal web machine direction. A further desirable pattern is a slant brick with the bricks at about 70° to the machine direction.

The following Examples illustrate the invention. All parts and percentages are by weight unless otherwise indicated. As reported in the Examples, energy absorption, Es, is obtained from Grab Tensile measurements by integrating the area under the stress-strain curve using a conventional Instron tensile testing machine equipped with an automatic integrator. As described in the Instron Manual Procedure No. 10-1-1c, energy absorption is related to the integrator read out according to the following formula (Measurement being made on 6 inches × 3 inches samples with a 3 inches jaw span and all values referred to herein being based on such a sample size.)

$$Es = (I/5000) \times L \times S$$

wherein
Es = Energy Absorption (in.-lbs.)
I = Integrator Read Out
L = Full Scale Load (lbs.)
S = Cross-Head Speed (in./min.)

Further with respect to the Examples, Grab Tensile (GT) and Elongation (E) are also measured on 6 inches × 3 inches samples using a cross-head speed of 12 in./min. and a 3 inches jaw span according to ASTM D 1,117-63. Trapezoidal Tear (TT) is measured using the following standard procedure: ASTM D 2263-65T. The reported values of Grab Toughness Index are obtained by multiplying the Grab Tensile by the Elongation and dividing by basis wight (oz./yd.$_2$). In obtaining this Index, the average values of Grab Tensile and Elongation over both machine and cross-directions are used.

EXAMPLE 1

Two laminates each having outer plies of creped cellulose wadding (each being 12 inches wide and having a basis weight of about 0.5 oz./yd.$^2$) and an inner ply of a continuous filament polypropylene web (12 inches wide with basis weight of about 0.5 oz./yd.$^2$) containing an intermittent pattern (bond points in density of about 200/in.$^2$ and occupying about 18 percent of web area) was prepared in the manner described above with reference to FIG. 1. The conditions of preparation were as follows: Web Speed = 50 ft./min., Roll 32 = 6.5 inch dia., 100 pli., pressure against drum 36; Drum 36 = 30 inches dia., 280°F.; Laminate wrap on drum surface = 4.25 feet. The adhesive applied at the printing station 18 was a plastisol consisting of: 50 parts polyvinyl chloride copolymer (Geon 130 × 10), 50 parts polyvinyl chloride homopolymer (Geon 120 × 241), 70 parts dioctyl phthalate plasticizer, and 10 parts low odor mineral spirits (No. 17). The plastisol was applied to the web in an amount of about 9 grams/yd.$^2$ and at a Brookfield viscosity of about 1,400 cps. (No. 4 spindle, 20 rpm.'s 30°C.). After printing, the plastisol occupied about 13% of the web area and was disposed thereon in a rectangular block (0.02 inch × 0.20 inch) pattern with 43,200 blocks/yd.$^2$.

The continuous filament webs (filament denier about 1.6) in the laminates were substantially identical except with respect to the intensity of the intermittent bonds. While both of the webs were bonded by passage through a similar heated roll nip as described in the previously mentioned Hansen and Pennings application, with one of the rolls containing raised points on its surface to give the above indicated bond pattern, the conditions of roll temperature and nip pressure were different so as to produce easily releasable bonds only in the Example 1 web. The web bonding conditions for the Example 1 web in the nip were as follows:

| | Temperature (°F.) | | Dwell | Nip |
|---|---|---|---|---|
| | Roll 1 | Roll 2 (containing raised points) | Time in Nip (sec) | Pressure (psi on raised points) |
| Example 1 | 305 | 285 | 0.007 | 4000 |

For preparation of the comparative web, more intense bonding conditions, particularly with respect to nip pressure which was several times higher than for Example 1, were employed. After bonding, the webs were heat set at 275°F. for 5 seconds under mild machine direction restraint.

The laminates prepared as above described, as well as the pre-bonded continuous filament webs, were tested with respect to energy absorption and the other properties previously discussed. The results are presented in Table 1.

TABLE I

|  | Web properties | | | | Laminate properties | | | |
|---|---|---|---|---|---|---|---|---|
|  | Example 1 | | Comparative | | Example 1 | | Comparative | |
|  | M.D. | C.D. | M.D. | C.D. | M.D. | C.D. | M.D. | C.D. |
| Energy absorption (in.-lbs.) | 4.3 | 4.3 | 7.1 | 4.0 | 16.2 | 25.6 | 5.1 | 4.8 |
| Elongation (%) | 37 | 41 | 33 | 40 | 33 | 66 | 21 | 30 |
| Trapezoidal tear (lbs.) | 2.1 | 2.5 | 2.8 | 2.3 | 6.9 | 7.3 | 2.4 | 1.9 |
| Grab tensile (lbs.) | 4.5 | 4.5 | 12.2 | 5.8 | 19 | 18 | 15 | 8.2 |
| Grab toughness index |  | 352 |  | 658 |  | 1,830 |  | 593 |

In further illustration of the present invention, additional intermittently bonded webs, differing in basis weight and bond intensity, and laminates fashioned therefrom were prepared. The webs and the laminates were prepared in a manner similar to that described with respect to Example 1 except that only a single ply of cellulose wadding was used.

Table II presents the bonding conditions used for the preparation of the intermittently bonded webs.

TABLE II

| Example | Basis Weight oz./yd.² | Dwell Temperature Roll 1 | Roll 2 | Time in Nip (sec) | Nip Pressure (psi on raised point) |
|---|---|---|---|---|---|
| 2 | 0.425 | 305 | 315 | 0.004 | 10500 |
| 3 | 0.425 | 305 | 290 | 0.004 | 4200 |
| 4 | 0.6 | 305 | 315 | 0.008 | 10500 |
| 5 | 0.6 | 305 | 290 | 0.008 | 4200 |
| 6 | 0.78 | 305 | 315 | 0.01 | 10500 |
| 7 | 0.78 | 305 | 290 | 0.01 | 4200 |
| 8 | 1 | 305 | 315 | 0.013 | 10500 |
| 9 | 1 | 305 | 290 | 0.013 | 4200 |
| 10 | 1.4 | 305 | 315 | 0.018 | 10500 |
| 11 | 1.4 | 305 | 290 | 0.018 | 4200 |

Laminates prepared from the Example 2-11 webs as well as the webs themselves were tested in the manner described with respect to Example 1 and the results thereof are given in Table III. All values represent averages of machine and cross-directions.

Laminates prepared from the webs of Examples 1-11

TABLE III

| Example |  | Grab tensile | Elongation | Energy | Absorption* | Trapezoidal tear | Grab toughness index |
|---|---|---|---|---|---|---|---|
| 2... | Web | 5.4 | 26 | 2.7 | 6.37 | 1.5 | 330 |
|  | Laminate | 9.2 | 30 | 5.2 | 12.2 | 2.0 | 650 |
| 3... | Web | 5.7 | 58 | 8.2 | 19.3 | 2.5 | 775 |
|  | Laminate | 13.5 | 53 | 15.8 | 37.2 | 4.7 | 1,680 |
| 4... | Web | 8.7 | 30 | 5.2 | 8.7 | 2.3 | 435 |
|  | Laminate | 11.6 | 35 | 7.6 | 12.6 | 3.0 | 694 |
| 5... | Web | 7.7 | 45 | 8.0 | 13.3 | 3.0 | 610 |
|  | Laminate | 17.8 | 49 | 17.8 | 29.6 | 5.4 | 1,450 |
| 6... | Web | 10.6 | 26 | 5.2 | 6.7 | 2.7 | 354 |
|  | Laminate | 16.3 | 30 | 9.0 | 11.5 | 3.6 | 630 |
| 7... | Web | 7.5 | 42 | 7.5 | 9.6 | 3.5 | 415 |
|  | Laminate | 22.5 | 51 | 25.1 | 32.1 | 7.5 | 1,480 |
| 8... | Web | 14.7 | 28 | 8.2 | 8.2 | 4.5 | 412 |
|  | Laminate | 23.7 | 36 | 16.9 | 16.9 | 5.2 | 850 |
| 9... | Web | 10.0 | 51 | 13.6 | 13.6 | 4.9 | 510 |
|  | Laminate | 29.7 | 70 | 44.5 | 44.5 | 12.8 | 2,080 |
| 10... | Web | 18.7 | 32 | 13.2 | 9.45 | 6.8 | 430 |
|  | Laminate | 36.0 | 76 | 59 | 42 | 12.3 | 2,030 |
| 11... | Web | 12.0 | 49 | 13.6 | 9.7 | 5.5 | 420 |
|  | Laminate | 49.1 | 69 | 66.5 | 47.5 | 20.8 | 2,400 |

* This column reports basis weight normalized Grab energy absorption values obtained by dividing the reported values of energy absorption by basis weight in oz./yd.² satisfy the aims and objectives of the present invention, particularly in their high capacity to absorb energy under strain. Based on the results presented in Tables I and III, laminates illustrative of those represented by the present invention have a basis weight normalized Grab energy absorption of at least about 11 and, preferably, at least about 30. Webs useful in preparing these laminates have a Grab Toughness Index of less than about 800 and, preferably, less than about 600. In addition, the illustrated laminates have desirable tensile strength and tear characteristics and exhibit a desirable hand, pleasing appearance, and good fluid absorbency and retention.

We claim as our invention:

1. An improved laminate comprising (1) a low strength, fluid permeable web and (2) a nonwoven web of substantially continuous and randomly deposited, molecularly oriented filaments of a thermoplastic polymer, said nonwoven web containing easily releasable, intermittent autogenous bonds; ply attachment in said laminate being achieved with a disruptable polymeric material which encapsulates said filaments at intermittent, discrete areas with easily releasable autogenous bonds disposed therebetween and extends into said web at said areas whereby, under laminate strain, failure of the autogenous bonds disposed between said areas initially occurs followed by disruption of the polymeric material, such failure and disruption being effected without substantial filament fracture.

2. The laminate of claim 1 wherein the autogenous bonds have an unfused bond area coefficient of at least about 55 percent.

3. The laminate of claim 1 wherein the autogenous bonds have an unfused bond area coefficient of at least about 65 percent.

4. The laminate of claim 1 wherein the low strength, fluid permeable web is a cellulosic web.

5. The laminate of claim 4 comprising outer plies of cellulosic webs and an inner ply of the continuous filament web.

6. The laminate of claim 1 wherein the polymeric material is a plasticized vinyl chloride polymer or copolymer.

7. The laminate of claim 5 wherein the polymeric material is a plasticized vinyl chloride polymer or copolymer.

8. The laminate of claim 7 wherein the autogenous bonds have an unfused bond area coefficient of at least about 65 percent.

9. The laminate of claim 1 wherein the thermoplastic polymer is polypropylene.

10. The laminate of claim 8 wherein the thermoplastic polymer is polypropylene.

11. The laminate of claim 4 wherein the continuous filament web as a basis weight of about 0.3–1.5 oz./yd.$^2$ and the filaments thereof are polypropylene with a denier of about 0.5–10.

12. The laminate of claim 11 wherein the continuous filament web has a strip tensile toughness index in both the machine and cross directions of less than about 130.

13. The laminate of claim 12 wherein the continuous filament web has a basis weight of about 0.3–0.8 oz./yd.$^2$ and the filaments thereof have a denier of about 0.8–3.

14. The laminate of claim 13 wherein the continuous filament web has a strip tensile toughness index in both the machine and cross directions of less than about 75 and the filaments thereof have a tenacity of greater than about 4 grams/denier.

15. The laminate of claim 14 comprising outer plies of cellulosic webs and an inner ply of the continuous filament web.

16. The laminate of claim 15 wherein the polymeric material is a plasticized vinyl chloride polymer or copolymer.

17. The laminate of claim 16 wherein the polymeric material is gelled but not fused.

18. An improved laminate comprising (1) a low strength, fluid permeable web and (2) a nonwoven web of substantially continuous and randomly deposited, molecularly oriented filaments of a thermoplastic polymer, said nonwoven web containing intermittent autogenous bonds of low intensity such that under strain the bonds disappear due to filament release without substantial filament fracture; ply attachment in said laminate being achieved with a polymeric material which encapsulates said filaments at intermittent, discrete areas with autogenous bonds disposed therebetween and extends into said low strength, fluid permeable web at said areas, said polymeric material having a cohesive strength greater than the autogenous bond strength but slightly less than the filament tenacity such that disruption of the polymeric material is effected under strain prior to excessive filament failure.

19. The laminate of claim 18 wherein the polymeric material is a plasticized vinyl chloride polymer or copolymer, and the thermoplastic polymer is polypropylene.

20. The laminate of claim 19 wherein the low strength, fluid permeable web is a cellulosic web and wherein the continuous filment web has a basis weight of about 0.3–1.5 oz./yd.$^2$ and the filaments thereof have a denier of about 0.8–3.

21. The laminate of claim 20 comprising outer plies of cellulosic webs and an inner ply of the continuous filament web.

22. The laminate of claim 21 wherein the autogenous bonds have an unfused bond area coefficient of at least about 65 percent.

23. The laminate of claim 21 wherein the continuous filament web has a grab toughness index of less than about 800.

24. The laminate of claim 23 wherein the continuous filament web has a grab toughness index of less than about 600.

25. The laminate of claim 24 wherein the continuous filament web has a basis weight of about 0.3–0.8 oz./yd.$^2$.

26. An improved laminate comprising (1) a low strength, fluid permeable cellulosic web and (2) a nonwoven web having a basis weight of about 0.3–1.5 oz./yd.$^2$ of substantially continuous and randomly deposited, molecularly oriented 0.8–3 denier filaments of polypropylene, said nonwoven web containing autogenous bonds occupying about 10–25 percent of the web area and intermittently distributed in a density of about 100–500/in.$^2$; ply attachment in said laminate being achieved with a disruptable polymeric material present in an amount of about 0.15–0.75 oz./yd.$^2$ which encapsulates said filaments at intermittent discrete areas with a portion of said intermittent bonds disposed therebetween and extends into said cellulosic web at said areas occupying less than about 25 percent of the web surface area, said continuous filament web having a grab toughness index of less than about 800 and said laminate having a basis weight normalized grab energy absorption of at least about 11.

27. The laminate of claim 26 comprising outer plies of cellulosic webs and an inner ply of the continuous filament web.

28. The laminate of claim 27 wherein the polymeric material is a gelled, plasticized vinyl chloride polymer or copolymer.

29. The laminate of claim 28 wherein the polymeric material is present in an amount of about 0.3–0.6 oz./yd.$^2$.

30. The laminate of claim 29 wherein said continuous filament web has a grab toughness index of less than about 600 and said laminate has a basis weight normalized grab energy absorption of at least about 30.

* * * * *